United States Patent
Kim et al.

(10) Patent No.: US 10,178,567 B2
(45) Date of Patent: Jan. 8, 2019

(54) METHOD FOR PERFORMING MEASUREMENT AND WIRELESS EQUIPMENT THEREOF

(71) Applicant: LG ELECTRONICS INC., Seoul (KR)

(72) Inventors: Sangwon Kim, Seoul (KR); Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 246 days.

(21) Appl. No.: 15/030,357

(22) PCT Filed: Oct. 27, 2014

(86) PCT No.: PCT/KR2014/010109
§ 371 (c)(1),
(2) Date: Apr. 18, 2016

(87) PCT Pub. No.: WO2015/064974
PCT Pub. Date: May 7, 2015

(65) Prior Publication Data
US 2016/0242055 A1    Aug. 18, 2016

Related U.S. Application Data

(60) Provisional application No. 61/897,836, filed on Oct. 31, 2013.

(51) Int. Cl.
*H04W 74/00* (2009.01)
*H04W 24/08* (2009.01)
(Continued)

(52) U.S. Cl.
CPC ............ *H04W 24/08* (2013.01); *H04L 5/00* (2013.01); *H04W 24/10* (2013.01); *H04W 28/08* (2013.01);
(Continued)

(58) Field of Classification Search
None
See application file for complete search history.

(56) References Cited

U.S. PATENT DOCUMENTS

| 2009/0122730 A1* | 5/2009 | Yang .................... H04W 36/30 370/280 |
| 2011/0103249 A1* | 5/2011 | Kim ..................... H04W 24/10 370/252 |

(Continued)

OTHER PUBLICATIONS

3GPP, "TS 36.331 v10.10.0", 6/13, 3GPP, all pages.*
PCT International Application No. PCT/KR2014/010109, International Search Report dated Jan. 19, 2015, 1 page.

*Primary Examiner* — Jutai Kao
(74) *Attorney, Agent, or Firm* — Lee, Hong, Degerman, Kang & Waimey

(57) ABSTRACT

There is provided a method of performing measurement. The method may be performed by a user equipment (UE) and comprise: receiving, by the UE, a cell list from a serving cell; if at least one cell in the cell list is detected, performing, by the UE, measurements on a frequency corresponding to the cell list and applying layer 3 filtering for the measurements; and if any cell in the cell list is not detected, not performing the measurements on the frequency corresponding to the cell list.

6 Claims, 13 Drawing Sheets

(51) Int. Cl.
*H04L 5/00* (2006.01)
*H04W 24/10* (2009.01)
*H04W 28/08* (2009.01)
*H04W 48/16* (2009.01)
*H04W 36/00* (2009.01)
*H04W 88/02* (2009.01)

(52) U.S. Cl.
CPC ........... *H04W 48/16* (2013.01); *H04W 74/00* (2013.01); *H04W 36/0085* (2018.08); *H04W 88/02* (2013.01)

(56) References Cited

U.S. PATENT DOCUMENTS

| | | | |
|---|---|---|---|
| 2011/0281587 A1 | 11/2011 | Jokinen et al. | |
| 2012/0115459 A1 | 5/2012 | Deng et al. | |
| 2012/0263145 A1* | 10/2012 | Marinier | H04W 36/22 370/331 |
| 2013/0128765 A1 | 5/2013 | Yang et al. | |
| 2013/0188624 A1* | 7/2013 | Lee | H04W 24/02 370/338 |
| 2014/0018081 A1* | 1/2014 | Johnstone | H04W 36/0061 455/444 |

* cited by examiner

Antenna 0

METHOD FOR PERFORMING MEASUREMENT AND WIRELESS EQUIPMENT THEREOF

CROSS-REFERENCE TO RELATED APPLICATIONS

This application is the National Stage filing under 35 U.S.C. 371 of International Application No. PCT/KR2014/010109, filed on Oct. 27, 2014, which claims the benefit of U.S. Provisional Application No. 61/897,836, filed on Oct. 31, 2013, the contents of which are all hereby incorporated by reference herein in their entirety.

FIELD OF THE INVENTION

The present invention relates to wireless communication, and more specifically, to a method for performing measurement and wireless equipment thereof.

RELATED ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In the 3rd or 4th mobile communication system, an attempt to increase a cell capacity is continuously made in order to support a high-capacity service and a bidirectional service such as multimedia contents, streaming, and the like.

An approach to use a high-frequency band and decrease a cell radius has been made in order to increase the cell capacity. When a small cell such as a pico cell or femto cell is adopted, a band higher than a frequency used in the existing cellular system may be used, and as a result, it is possible to transfer more information.

However, due to dense deployment of small cells, intensive inter-frequency small cell measurements are need for the purpose of offloading. But, this is not desirable in terms of UE power consumption and serving cell service interruption time.

SUMMARY OF THE INVENTION

Therefore, an object of the present invention is to solve the above-explained disadvantages.

To achieve these and other advantages and in accordance with the purpose of the present invention, as embodied and broadly described herein, there is provided a solution which allows the UE to perform the measurements only when the UE detects a cell listed in a cell list.

In more detail, to achieve these and other advantages and in accordance with the purpose of the present invention, as embodied and broadly described herein, there is provided a method of performing measurement. The method may be performed by a user equipment (UE) and comprise: receiving, by the UE, a cell list from a serving cell; if at least one cell in the cell list is detected, performing, by the UE, measurements on a frequency corresponding to the cell list and applying layer 3 filtering for the measurements; and if any cell in the cell list is not detected, not performing the measurements on the frequency corresponding to the cell list.

The cell list may include a list of cells per a frequency. The cell list may include cell identifiers of small cells to which data of the UE is to be offloaded.

The cell may be detected by a cell search procedure, while the any cell may not be detected by the cell search procedure. In other words, during the cell search procedure, the cell may be detected or the any cell may not be detected.

If the measurement on the frequency is not performed, the measurement on the frequency may not be performed on any detected cells operated on the frequency.

Also, to achieve these and other advantages and in accordance with the purpose of the present invention, as embodied and broadly described herein, there is provided a wireless equipment for performing measurement. The wireless equipment may comprise: a transceiver configured to receive a cell list from a serving cell; and a processor connected to the transceiver and configured to: if at least one cell in the cell list is detected, perform measurements on a frequency corresponding to the cell list and apply layer 3 filtering for the measurements; and if any cell in the cell list is not detected, not perform the measurements on the frequency corresponding to the cell list.

According to the present disclosure, the above-explained problem may be solved.

BRIEF DESCRIPTION OF THE DRAWINGS

FIG. 12a show one exemplary scenario and FIG. 12b shows signal flows under the scenario shown in FIG. 12a.

DESCRIPTION OF EXEMPLARY EMBODIMENTS

Figure 1:
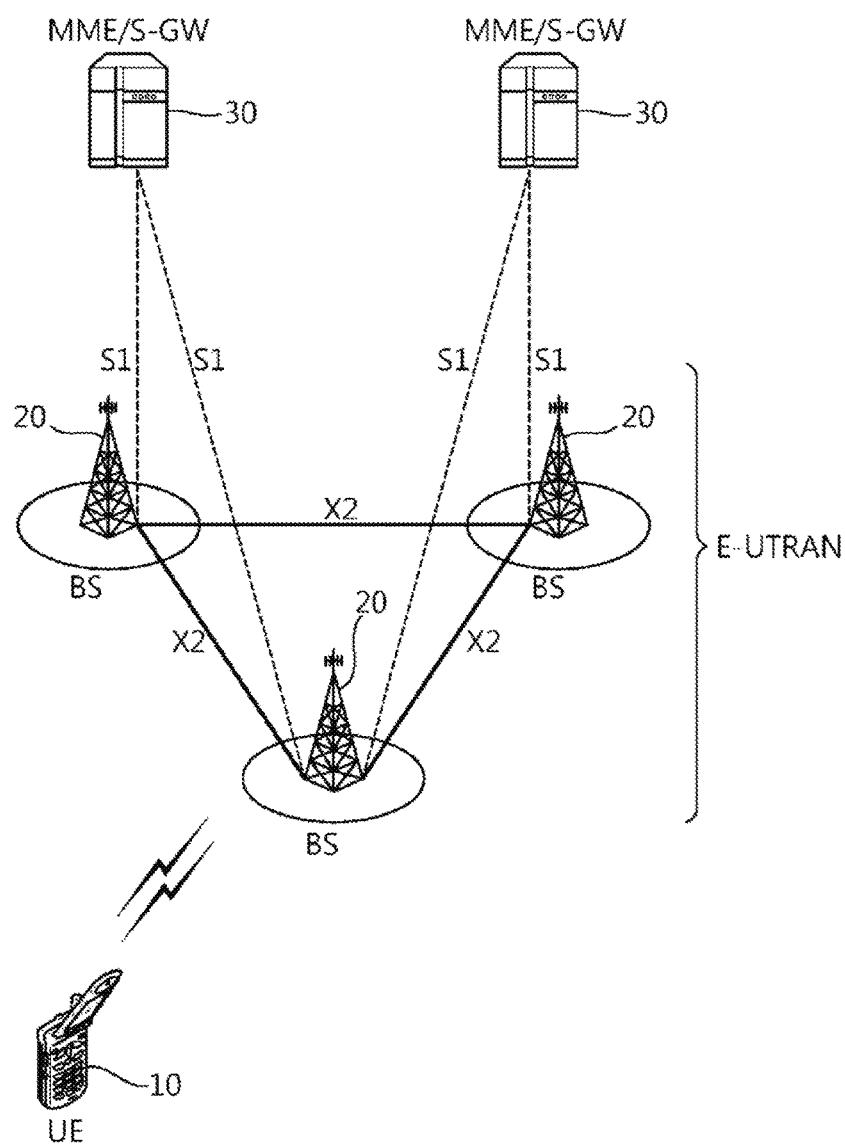
FIG. 1 shows a wireless communication system to which the present invention is applied.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNodeB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
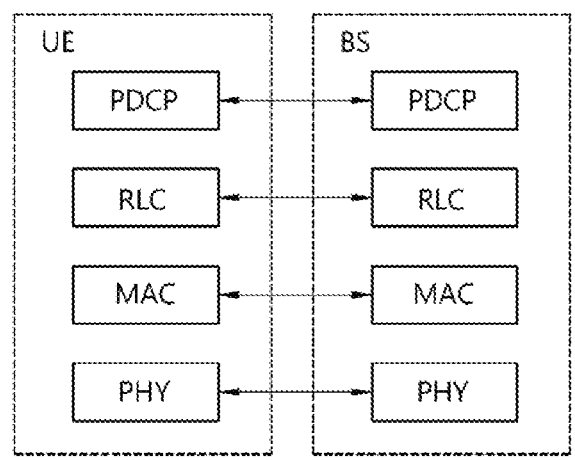
FIG. 2 is a diagram showing a radio protocol architecture for a user plane.
Figure 3:
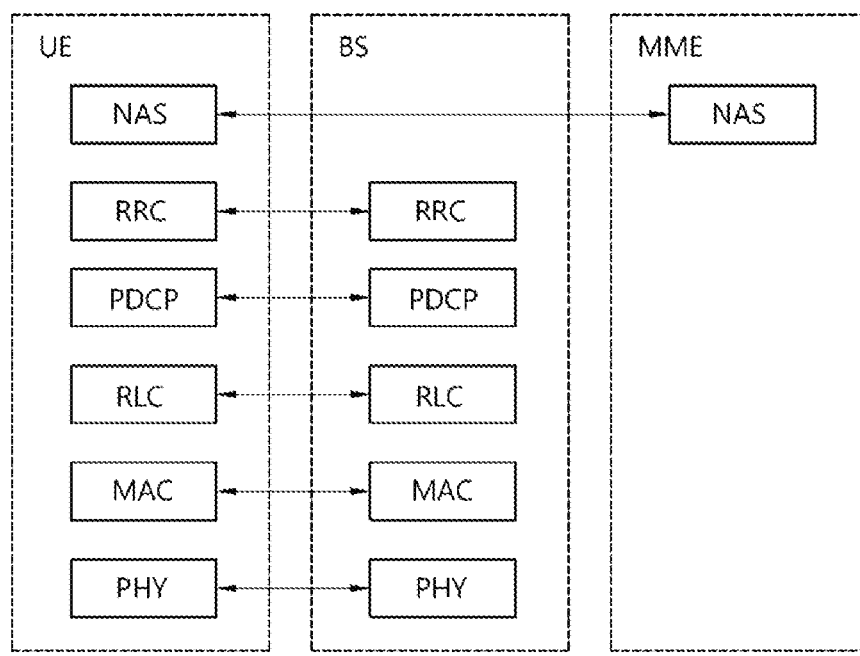
FIG. 3 is a diagram showing a radio protocol architecture for a control plane.

FIG. 2 is a diagram showing a radio protocol architecture for a user plane. FIG. 3 is a diagram showing a radio protocol architecture for a control plane.

The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 4:
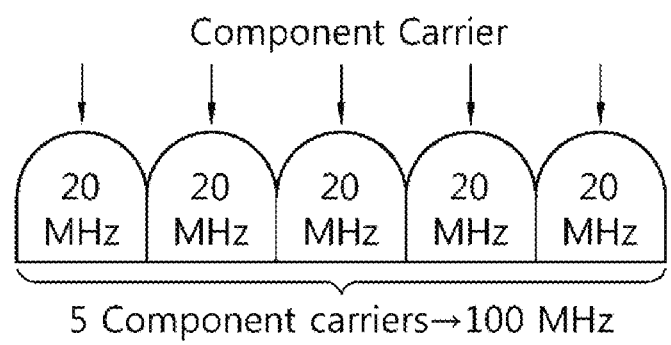
FIG. 4 shows an example of a wideband system using carrier aggregation for 3GPP LTE-A.

FIG. 4 shows an example of a wideband system using carrier aggregation for 3GPP LTE-A.

Component carrier (CC) means the carrier used in then carrier aggregation system and may be briefly referred as carrier.

Referring to FIG. 4, each component carrier (CC) has a bandwidth of 20 MHz, which is a bandwidth of the 3GPP LTE. Up to 5 CCs may be aggregated, so maximum bandwidth of 100 MHz may be configured.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of a uplink frequency resource and a downlink frequency resource.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

Figure 5:
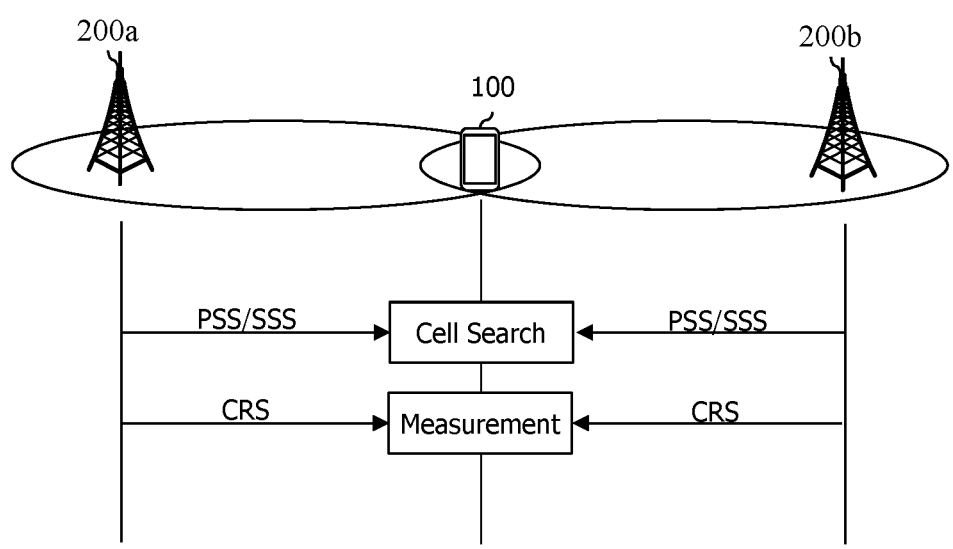
FIG. 5 shows a cell search procedure and a measurement procedure.

FIG. 5 shows a cell search procedure and a measurement procedure.

Referring to FIG. 5, each of cells 200*a* and 200*b* broadcasts synchronization signals such as a primary synchronization signal (PSS) and a secondary synchronization signal (SSS). The UE 100 performs an E-UTRA cell search procedure using the PSS/SSS. During the E-UTRA cell search procedure, the UE 100 acquires time and frequency synchronization with each cell and detects a physical layer Cell ID of each cell. The E-UTRA cell search procedure supports a scalable overall transmission bandwidth corresponding to 6 resource blocks and upwards.

The UE 100 may assume that antenna ports 0-3 and the antenna port for the PSS/SSS of each cell are quasi co-located with respect to Doppler shift and average delay.

Meanwhile, each of cells 200*a* and 200*b* broadcasts a cell-specific reference signal (CRS). Then the UE 100 performs measurements using the CRS.

Hereinafter, the CRS will be explained in more detail.

Figure 6:
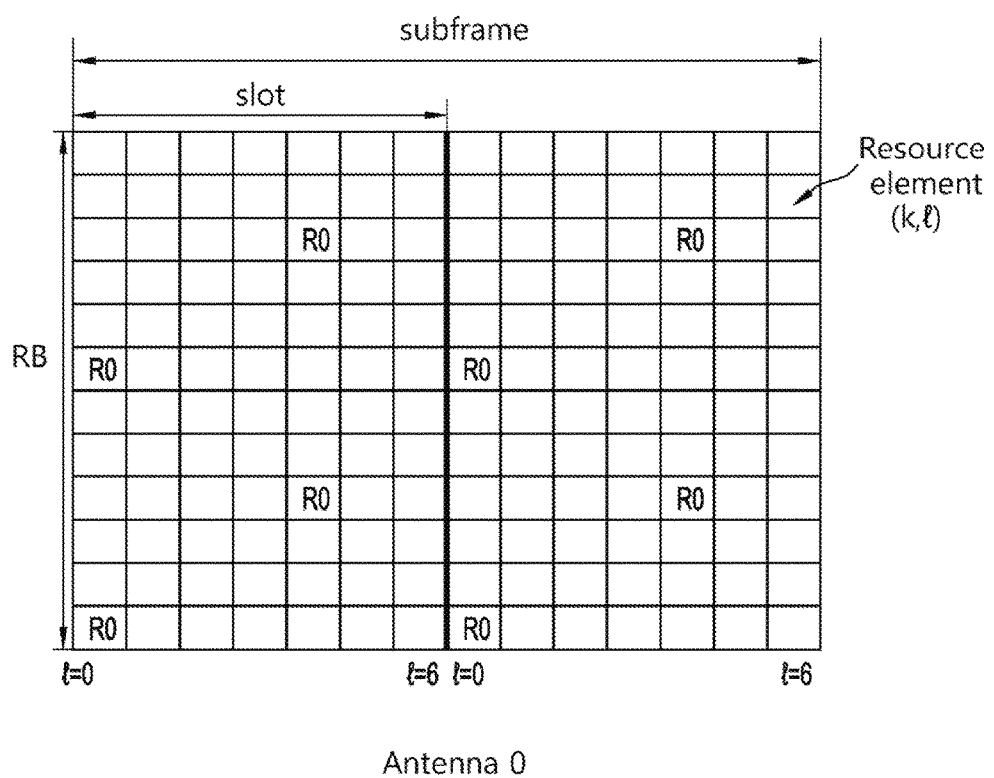
FIGS. 6 to 8 show examples of an RB to which a CRS is mapped.
Figure 7:
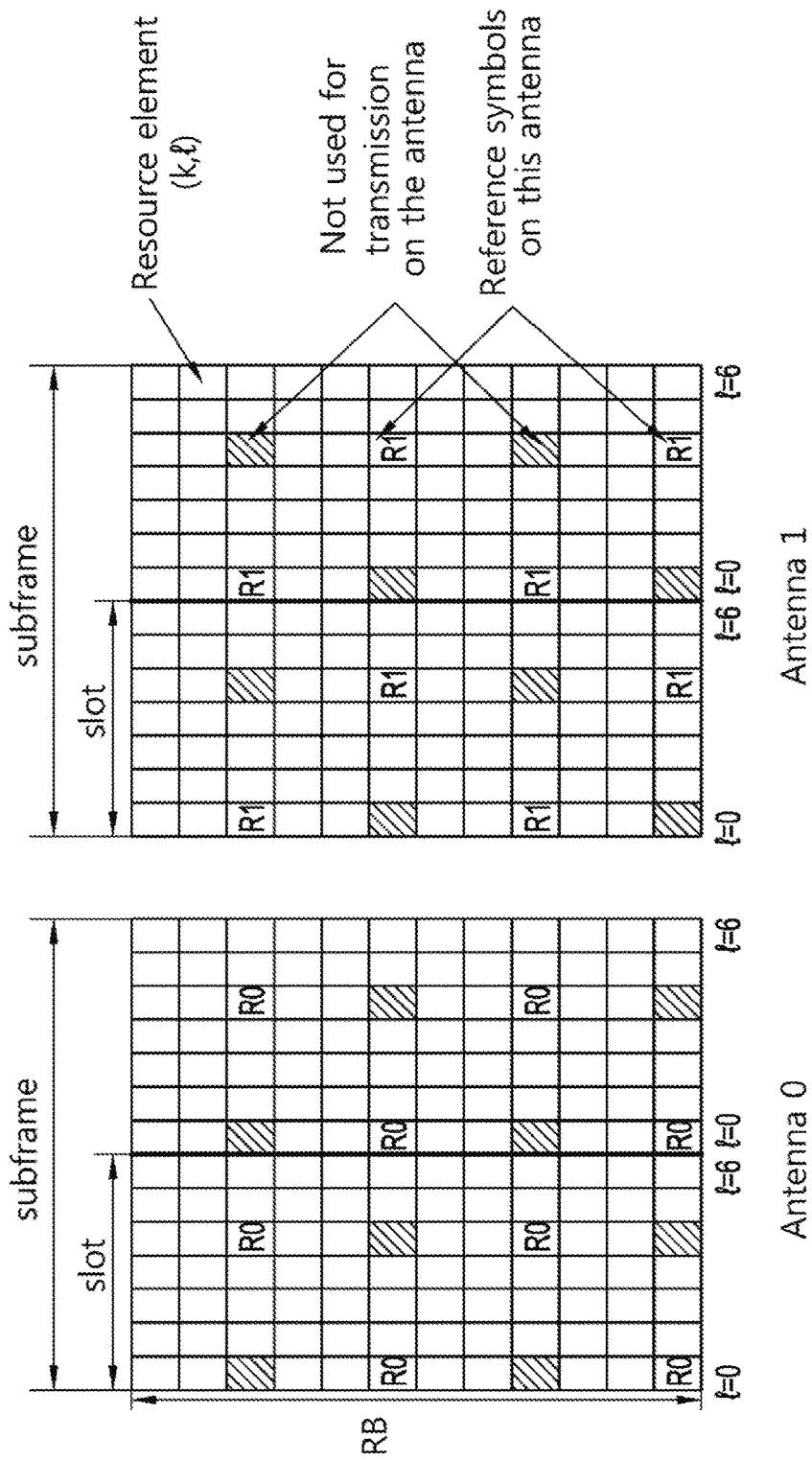
Figure 8:
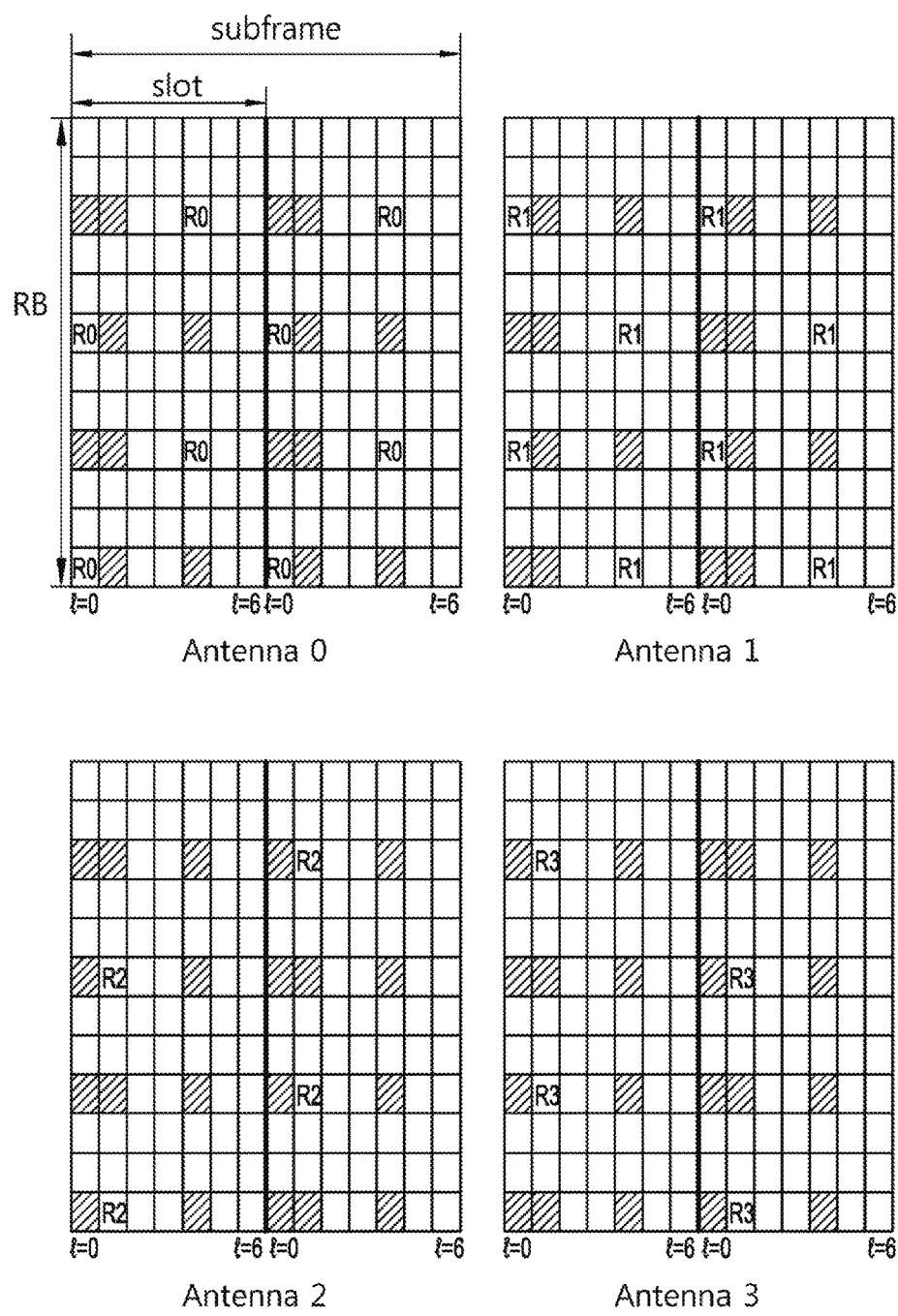

FIGS. 6 to 8 show examples of an RB to which a CRS is mapped.

FIG. 6 shows one example of a pattern in which a CRS is mapped to an RB when an eNodeB uses a single antenna port. FIG. 7 shows one example of a pattern in which a CRS is mapped to an RB when an eNodeB uses two antenna ports. FIG. 8 shows one example of a pattern in which a CRS is mapped to an RB when an eNodeB uses four antenna ports. The CRS patterns may be used to support features of the LTE-A. For example, the CRS patterns may be used to support coordinated multi-point (CoMP) transmission/reception technique, spatial multiplexing, etc. Also, the CRS may be used for channel quality measurement, CP detection, time/frequency synchronization, etc.

Referring to FIGS. 6 to 8, in case the eNodeB carries out multiple antenna transmission using a plurality of antenna ports, one resource grid is allocated to each antenna port. 'R0' represents a reference signal for a first antenna port. 'R1' represents a reference signal for a second antenna port. 'R2' represents a reference signal for a third antenna port. 'R3' represents a reference signal for a fourth antenna port. Positions of R0 to R3 within a subframe do not overlap with each other. l, representing the position of an OFDM symbol within a slot, may take a value ranging from 0 to 6 in a normal CP. In one OFDM symbol, a reference signal for each antenna port is placed apart by an interval of six subcarriers. The number of R0 and the number of R1 in a subframe are the same to each other while the number of R2 and the number of R3 are the same to each other. The number of R2 or R3 within a subframe is smaller than the number of R0 or R1. A resource element used for a reference signal of one antenna port is not used for a reference signal of another antenna port. This is intended to avoid generating interference among antenna ports.

The CRSs are always transmitted as many as the number of antenna ports regardless of the number of streams. The CRS has a separate reference signal for each antenna port. The frequency domain position and time domain position of the CRS within a subframe are determined regardless of user equipments. The CRS sequence multiplied to the CRS is also generated regardless of user equipments. Therefore, all of user equipments within a cell may receive the CRS. However, it should be noted that the CRS position within a subframe and the CRS sequence may be determined according to cell IDs. The time domain position of the CRS within a subframe may be determined according to an antenna port number and the number of OFDM symbols within a resource block. The frequency domain position of the CRS within a subframe may be determined according to an antenna port number, cell ID, OFDM symbol index (l), a slot number within a radio frame, etc.

Figure 9:
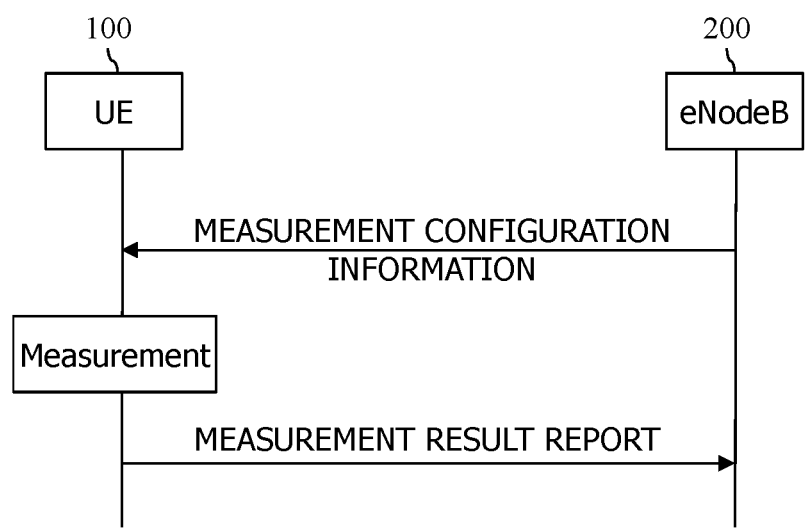
FIG. 9 is a flowchart showing a conventional method of performing measurement.

FIG. 9 is a flowchart showing a conventional method of performing measurement.

The UE 100 receives measurement configuration information from the E-UTRAN, for example, the eNodeB 200. A message including the measurement configuration information is referred to as a measurement configuration message. The UE 100 performs measurement based on the measurement configuration information. If a measurement result satisfies a reporting condition included in the measurement configuration information, the UE 100 reports the measurement result to the eNodeB 200. A message including the measurement result is referred to as a measurement report message.

The UE reports measurement information in accordance with the measurement configuration as provided by the E-UTRAN. The E-UTRAN (i.e., eNodeB 200) provides the measurement configuration applicable for a UE in RRC_CONNECTED by means of dedicated signalling, i.e. using the RRCConnectionReconfiguration message.

The UE can be requested to perform the following types of measurements:
  Intra-frequency measurements: measurements at the downlink carrier frequency(ies) of the serving cell(s).
  Inter-frequency measurements: measurements at frequencies that differ from any of the downlink carrier frequency(ies) of the serving cell(s).
  Inter-RAT measurements of UTRA frequencies.
  Inter-RAT measurements of GERAN frequencies.
  Inter-RAT measurements of CDMA2000 HRPD or CDMA2000 1×RTT frequencies.

The measurement configuration includes the following parameters:
  1. Measurement objects: The objects on which the UE shall perform the measurements.
    For intra-frequency and inter-frequency measurements a measurement object is a single E-UTRA carrier frequency. Associated with this carrier frequency, E-UTRAN can configure a list of cell specific offsets and a list of 'blacklisted' cells. Blacklisted cells are not considered in event evaluation or measurement reporting.
    For inter-RAT UTRA measurements a measurement object is a set of cells on a single UTRA carrier frequency.
    For inter-RAT GERAN measurements a measurement object is a set of GERAN carrier frequencies.
    For inter-RAT CDMA2000 measurements a measurement object is a set of cells on a single (HRPD or 1×RTT) carrier frequency.
    Some measurements using the above mentioned measurement objects, only concern a single cell, e.g. measurements used to report neighbouring cell system information, PCell UE Rx-Tx time difference.
  2. Reporting configurations: A list of reporting configurations where each reporting configuration consists of the following:
    Reporting criterion: The criterion that triggers the UE to send a measurement report. This can either be periodical or a single event description.
    Reporting format: The quantities that the UE includes in the measurement report and associated information (e.g. number of cells to report).
  3. Measurement identities: A list of measurement identities where each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.
  4. Quantity configurations: One quantity configuration is configured per RAT type. The quantity configuration defines the measurement quantities and associated filtering used for all event evaluation and related reporting of that measurement type. One filter can be configured per measurement quantity.
  5. Measurement gaps: Periods that the UE may use to perform measurements, i.e. no (UL, DL) transmissions are scheduled.

E-UTRAN only configures a single measurement object for a given frequency, i.e. it is not possible to configure two or more measurement objects for the same frequency with different associated parameters, e.g. different offsets and/or blacklists. E-UTRAN may configure multiple instances of the same event e.g. by configuring two reporting configurations with different thresholds.

The UE maintains a single measurement object list, a single reporting configuration list, and a single measurement identities list. The measurement object list includes measurement objects, that are specified per RAT type, possibly including intra-frequency object(s) (i.e. the object(s) corresponding to the serving frequency(ies)), inter-frequency object(s) and inter-RAT objects. Similarly, the reporting configuration list includes E-UTRA and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The serving cell(s)—these are the PCell and one or more SCells, if configured for a UE supporting CA.
2. Listed cells—these are cells listed within the measurement object(s).
3. Detected cells—these are cells that are not listed within the measurement object(s) but are detected by the UE on the carrier frequency(ies) indicated by the measurement object(s).

For E-UTRA, the UE measures and reports on the serving cell(s), listed cells and detected cells. For inter-RAT UTRA, the UE measures and reports on listed cells and optionally on cells that are within a range for which reporting is allowed by E-UTRAN. For inter-RAT GERAN, the UE measures and reports on detected cells. For inter-RAT CDMA2000, the UE measures and reports on listed cells.

For inter-RAT UTRA and CDMA2000, the UE measures and reports also on detected cells for the purpose of SON.

This specification is based on the assumption that typically CSG cells of home deployment type are not indicated within the neighbour list. Furthermore, the assumption is that for non-home deployments, the physical cell identity is unique within the area of a large macro cell (i.e. as for UTRAN).

Whenever the procedural specification, other than contained in sub-clause 5.5.2, refers to a field it concerns a field included in the VarMeasConfig unless explicitly stated otherwise i.e. only the measurement configuration procedure covers the direct UE action related to the received measConfig.

Hereinafter, the measurement configuration will be explained in more detail.

E-UTRAN applies the procedure as follows:
 to ensure that, whenever the UE has a measConfig, it includes a measObject for each serving frequency;
 to configure at most one measurement identity using a reporting configuration with the purpose set to reportCGI;

The UE shall:
 1> if the received measConfig includes the measObjectToRemoveList:
  2> perform the measurement object removal procedure;
 1> if the received measConfig includes the measObjectToAddModList:
  2> perform the measurement object addition/modification procedure;
 1> if the received measConfig includes the reportConfigToRemoveList:
  2> perform the reporting configuration removal procedure;
 1> if the received measConfig includes the reportConfigToAddModList:
  2> perform the reporting configuration addition/modification procedure;
 1> if the received measConfig includes the quantityConfig:
  2> perform the quantity configuration procedure;
 1> if the received measConfig includes the measIdToRemoveList:
  2> perform the measurement identity removal procedure;
 1> if the received measConfig includes the measIdToAddModList:
  2> perform the measurement identity addition/modification procedure;
 1> if the received measConfig includes the measGapConfig:
  2> perform the measurement gap configuration procedure;
 1> if the received measConfig includes the s-Measure:
  2> set the parameter s-Measure within VarMeasConfig to the lowest value of the RSRP ranges indicated by the received value of s-Measure;
 1> if the received measConfig includes the preRegistrationInfoHRPD:
  2> forward the preRegistrationInfoHRPD to CDMA2000 upper layers;
 1> if the received measConfig includes the speedStatePars:
  2> set the parameter speedStatePars within VarMeasConfig to the received value of speedStatePars;

Hereinafter, a Measurement object removal will be explained.

For each measObjectId included in the received measObjectToRemoveList that is part of the current UE configuration in VarMeasConfig, the UE shall:
 1> for each measId included in the received measIdToRemoveList that is part of the current UE configuration in VarMeasConfig:
  2> remove the entry with the matching measId from the measIdList within the VarMeasConfig;
  2> remove the measurement reporting entry for this measId from the VarMeasReportList, if included;
  2> stop the periodical reporting timer or timer T321, whichever one is running, and reset the associated information (e.g. timeToTrigger) for this measId;

Hereinafter, a measurement object addition/modification will be explained.
 1> for each measObjectId included in the received measObjectToAddModList:
  2> if an entry with the matching measObjectId exists in the measObjectList within the VarMeasConfig, for this entry:
   3> replace the entry with the value received for this measObject, except for the fields cellsToAddModList, blackCellsToAddModList, cellsToRemoveList, blackCellsToRemoveList and measSubframePatternConfigNeigh;
   3> if the received measObject includes the cellsToRemoveList:
    4> for each cellIndex included in the cellsToRemoveList:
     5> remove the entry with the matching cellIndex from the cellsToAddModList;
   3> if the received measObject includes the cellsToAddModList:
    4> for each cellIndex value included in the cellsToAddModList:
     5> if an entry with the matching cellIndex exists in the cellsToAddModList:
      6> replace the entry with the value received for this cellIndex;
     5> else:
      6> add a new entry for the received cellIndex to the cellsToAddModList;
   3> if the received measObject includes the blackCellsToRemoveList:
    4> for each cellIndex included in the blackCellsToRemoveList:
     5> remove the entry with the matching cellIndex from the blackCellsToAddModList;

3> if the received measObject includes the blackCellsToAddModList:
4> for each cellIndex included in the blackCellsToAddModList:
5> if an entry with the matching cellIndex is included in the blackCellsToAddModList:
6> replace the entry with the value received for this cellIndex;
5> else:
6> add a new entry for the received cellIndex to the blackCellsToAddModList;
3> if the received measObject includes measSubframePatternConfigNeigh:
4> set measSubframePatternConfigNeigh within the VarMeasConfig to the value of the received field
3> for each measId associated with this measObjectId in the measIdList within the VarMeasConfig, if any:
4> remove the measurement reporting entry for this measId from the VarMeasReportList, if included;
4> stop the periodical reporting timer or timer T321, whichever one is running, and reset the associated information (e.g. timeToTrigger) for this measId;
2> else:
3> add a new entry for the received measObject to the measObjectList within VarMeasConfig;
Hereinafter, a reporting configuration removal will be explained.
The UE shall:
1> for each reportConfigId included in the received reportConfigToRemoveList that is part of the current UE configuration in VarMeasConfig:
2> remove the entry with the matching reportConfigId from the reportConfigList within the VarMeasConfig;
2> remove all measId associated with the reportConfigId from the measIdList within the VarMeasConfig, if any;
2> if a measId is removed from the measIdList:
3> remove the measurement reporting entry for this measId from the VarMeasReportList, if included;
3> stop the periodical reporting timer or timer T321, whichever one is running, and reset the associated information (e.g. timeToTrigger) for this measId;
Hereinafter, a reporting configuration addition/modification will be explained.
The UE shall:
1> for each reportConfigId included in the received reportConfigToAddModList:
2> if an entry with the matching reportConfigId exists in the reportConfigList within the VarMeasConfig, for this entry:
3> replace the entry with the value received for this reportConfig;
3> for each measId associated with this reportConfigId included in the measIdList within the VarMeasConfig, if any:
4> remove the measurement reporting entry for this measId from in VarMeasReportList, if included;
4> stop the periodical reporting timer or timer T321, whichever one is running, and reset the associated information (e.g. timeToTrigger) for this measId;
2> else:
3> add a new entry for the received reportConfig to the reportConfigList within the VarMeasConfig;
Hereinafter, a quantity configuration will be explained.
The UE shall:
1> for each RAT for which the received quantityConfig includes parameter(s):

2> set the corresponding parameter(s) in quantityConfig within VarMeasConfig to the value of the received quantityConfig parameter(s);
1> for each measId included in the measIdList within VarMeasConfig:
2> remove the measurement reporting entry for this measId from the VarMeasReportList, if included;
2> stop the periodical reporting timer or timer T321, whichever one is running, and reset the associated information (e.g. timeToTrigger) for this measId;
Hereinafter, Measurement gap configuration will be explained.
The UE shall:
1> if measGapConfig is set to setup:
2> if a measurement gap configuration is already setup, release the measurement gap configuration;
2> setup the measurement gap configuration indicated by the measGapConfig in accordance with the received gapOffset
1> else:
2> release the measurement gap configuration.
Hereinafter, a detail for performing measurements will be explained
For all measurements the UE applies the layer 3 filtering as specified in 5.5.3.2, before using the measured results for evaluation of reporting criteria or for measurement reporting.
The UE shall:
1> whenever the UE has a measConfig, perform RSRP and RSRQ measurements for each serving cell, applying for the PCell the time domain measurement resource restriction in accordance with measSubframePatternPCell, if configured;
1> for each measId included in the measIdList within VarMeasConfig:
2> if the purpose for the associated reportConfig is set to reportCGI:
3> if si-RequestForHO is configured for the associated reportConfig:
4> perform the corresponding measurements on the frequency and RAT indicated in the associated measObject using autonomous gaps as necessary;
3> else:
4> perform the corresponding measurements on the frequency and RAT indicated in the associated measObject using available idle periods or using autonomous gaps as necessary;
3> try to acquire the global cell identity of the cell indicated by the cellForWhichToReportCGI in the associated measObject by acquiring the relevant system information from the concerned cell;
3> if the cell indicated by the cellForWhichToReportCGI included in the associated measObject is an E-UTRAN cell:
4> try to acquire the CSG identity, if the CSG identity is broadcast in the concerned cell;
4> try to acquire the trackingAreaCode in the concerned cell;
4> try to acquire the list of additional PLMN Identities, as included in the plmn-IdentityList, if multiple PLMN identities are broadcast in the concerned cell;
3> if the cell indicated by the cellForWhichToReportCGI included in the associated measObject is a UTRAN cell:
4> try to acquire the LAC, the RAC and the list of additional PLMN Identities, if multiple PLMN identities are broadcast in the concerned cell;
4> try to acquire the CSG identity, if the CSG identity is broadcast in the concerned cell;

3> if the cell indicated by the cellForWhichToReportCGI included in the associated measObject is a GERAN cell:
  4> try to acquire the RAC in the concerned cell;
3> if the cell indicated by the cellForWhichToReportCGI included in the associated measObject is a CDMA2000 cell and the cdma2000-Type included in the measObject is typeHRPD:
  4> try to acquire the Sector ID in the concerned cell;
3> if the cell indicated by the cellForWhichToReportCGI included in the associated measObject is a CDMA2000 cell and the cdma2000-Type included in the measObject is type 1×RTT:
  4> try to acquire the BASE ID, SID and NID in the concerned cell;
2> else:
3> if a measurement gap configuration is setup; or
3> if the UE does not require measurement gaps to perform the concerned measurements:
  4> if s-Measure is not configured; or
  4> if s-Measure is configured and the PCell RSRP, after layer 3 filtering, is lower than this value:
    5> perform the corresponding measurements of neighbouring cells on the frequencies and RATs indicated in the concerned measObject, applying for neighbouring cells on the primary frequency the time domain measurement resource restriction in accordance with measSubframePatternConfigNeigh, if configured in the concerned measObject;
  4> if the ue-RxTxTimeDiffPeriodical is configured in the associated reportConfig:
    5> perform the UE Rx-Tx time difference measurements on the PCell;
2> perform the evaluation of reporting criteria as specified in 5.5.4;

Now, a layer 3 filtering will be explained.

The UE shall:
1> for each measurement quantity that the UE performs measurements:
2> filter the measured result, before using for evaluation of reporting criteria or for measurement reporting, by the following equation:

$$F_n = (1-a) \cdot F_{n-1} + a \cdot M_n \quad \text{[Equation 1]}$$

TABLE 1

| | |
|---|---|
| $M_n$ | the latest received measurement result from the physical layer |
| $F_n$ | the updated filtered measurement result, that is used for evaluation of reporting criteria or for measurement reporting |
| $F_{n-1}$ | the old filtered measurement result, where $F_0$ is set to $M_1$ when the first measurement result from the physical layer is received |
| $a = 1/2^{(k/4)}$ | where k is the filterCoefficent for the corresponding measurement quantity received by the quantityConfig |

2> adapt the filter such that the time characteristics of the filter are preserved at different input rates, observing that the filterCoefficent k assumes a sample rate equal to 200 ms;

If k is set to 0, no layer 3 filtering is applicable.

The filtering is performed in the same domain as used for evaluation of reporting criteria or for measurement reporting, i.e., logarithmic filtering for logarithmic measurements.

The filter input rate is implementation dependent, to fulfil the performance requirements set in [16]. For further details about the physical layer measurements.

Hereinafter, a measurement report triggering will be explained.

The UE shall:
1> for each measId included in the measIdList within VarMeasConfig:
2> if the corresponding reportConfig includes a purpose set to reportStrongestCellsForSON:
  3> consider any neighbouring cell detected on the associated frequency to be applicable;
2> else if the corresponding reportConfig includes a purpose set to reportCGI:
  3> consider any neighbouring cell detected on the associated frequency/set of frequencies (GERAN) which has a physical cell identity matching the value of the cellForWhichToReportCGI included in the corresponding measObject within the VarMeasConfig to be applicable;
2> else:
3> if the corresponding measObject concerns E-UTRA:
  4> if the ue-RxTxTimeDiffPeriodical is configured in the corresponding reportConfig:
    5> consider only the PCell to be applicable;
  4> else if the eventA1 or eventA2 is configured in the corresponding reportConfig:
    5> consider only the serving cell to be applicable;
  4> else:
    5> consider any neighbouring cell detected on the associated frequency to be applicable when the concerned cell is not included in the blackCellsToAddModList defined within the VarMeasConfig for this measId;
    5> for events involving a serving cell on one frequency and neighbours on another frequency, consider the serving cell on the other frequency as a neighbouring cell;
3> else if the corresponding measObject concerns UTRA or CDMA2000:
  4> consider a neighbouring cell on the associated frequency to be applicable when the concerned cell is included in the cellsToAddModList defined within the VarMeasConfig for this measId (i.e. the cell is included in the white-list);

The UE may also consider a neighbouring cell on the associated UTRA frequency to be applicable when the concerned cell is included in the csg-allowedReportingCells within the VarMeasConfig for this measId, if configured in the corresponding measObjectUTRA (i.e. the cell is included in the range of physical cell identities for which reporting is allowed).

3> else if the corresponding measObject concerns GERAN:
  4> consider a neighbouring cell on the associated set of frequencies to be applicable when the concerned cell matches the ncc-Permitted defined within the VarMeasConfig for this measId;
2> if the triggerType is set to event and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include an measurement reporting entry for this measId (a first cell triggers the event):
  3> include a measurement reporting entry within the VarMeasReportList for this measId;
  3> set the numberOfReportsSent defined within the VarMeasReportList for this measId to 0;
  3> include the concerned cell(s) in the cellsTriggeredList defined within the VarMeasReportList for this measId;
  3> initiate the measurement reporting procedure;
2> if the triggerType is set to event and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
 3> set the numberOfReportsSent defined within the VarMeasReportList for this measId to 0;
 3> include the concerned cell(s) in the cellsTriggeredList defined within the VarMeasReportList for this measId;
 3> initiate the measurement reporting procedure, as specified in 5.5.5;
2> if the triggerType is set to event and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
 3> remove the concerned cell(s) in the cellsTriggeredList defined within the VarMeasReportList for this measId;
 3> if reportOnLeave is set to TRUE for the corresponding reporting configuration or if a6-ReportOnLeave is set to TRUE for the corresponding reporting configuration:
  4> initiate the measurement reporting procedure;
 3> if the cellsTriggeredList defined within the VarMeasReportList for this measId is empty:
  4> remove the measurement reporting entry within the VarMeasReportList for this measId;
  4> stop the periodical reporting timer for this measId, if running;
2> if the purpose is included and set to reportStrongestCells or to reportStrongestCellsForSON and if a (first) measurement result is available for one or more applicable cells:
 3> include a measurement reporting entry within the VarMeasReportList for this measId;
 3> set the numberOfReportsSent defined within the VarMeasReportList for this measId to 0;
 3> initiate the measurement reporting procedure;
If the purpose is set to reportStrongestCells, the UE initiates a first measurement report immediately after the quantity to be reported becomes available for at least either all serving cells or one of the applicable cells. If the purpose is set to reportStrongestCellsForSON, the UE initiates a first measurement report when it has determined the strongest cells on the associated frequency.
2> upon expiry of the periodical reporting timer for this measId:
 3> initiate the measurement reporting procedure, as specified in 5.5.5;
2> if the purpose is included and set to reportCGI and if the UE acquired the information needed to set all fields of cgi-Info for the requested cell:
 3> include a measurement reporting entry within the VarMeasReportList for this measId;
 3> set the numberOfReportsSent defined within the VarMeasReportList for this measId to 0;
 3> stop timer T321;
 3> initiate the measurement reporting procedure;
2> upon expiry of the T321 for this measId:
 3> include a measurement reporting entry within the VarMeasReportList for this measId;
 3> set the numberOfReportsSent defined within the VarMeasReportList for this measId to 0;
 3> initiate the measurement reporting procedure, as specified in 5.5.5;
The UE does not stop the periodical reporting with triggerType set to event or to periodical while the corresponding measurement is not performed due to the PCell RSRP being equal to or better than s-Measure or due to the measurement gap not being setup.

If the UE is configured with DRX, the UE may delay the measurement reporting for event triggered and periodical triggered measurements until the Active Time.

Hereinafter, a measurement reporting procedure will be explained.

The purpose of this procedure is to transfer measurement results from the UE to E-UTRAN.

For the measId for which the measurement reporting procedure was triggered, the UE shall set the measResults within the MeasurementReport message as follows:
1> set the measId to the measurement identity that triggered the measurement reporting;
1> set the measResultPCell to include the quantities of the PCell;
1> set the measResultServFreqList to include for each SCell that is configured, if any, within measResultSCell the quantities of the concerned SCell;
1> if the reportConfig associated with the measId that triggered the measurement reporting includes reportAddNeighMeas:
 2> for each serving frequency for which measObjectId is referenced in the measIdList, other than the frequency corresponding with the measId that triggered the measurement reporting:
  3> set the measResultServFreqList to include within measResultBestNeighCell the physCellId and the quantities of the best non-serving cell, based on RSRP, on the concerned serving frequency;
1> if there is at least one applicable neighbouring cell to report:
 2> set the measResultNeighCells to include the best neighbouring cells up to maxReportCells in accordance with the following:
  3> if the triggerType is set to event:
   4> include the cells included in the cellsTriggeredList as defined within the VarMeasReportList for this measId;
  3> else:
   4> include the applicable cells for which the new measurement results became available since the last periodical reporting or since the measurement was initiated or reset;
The reliability of the report (i.e. the certainty it contains the strongest cells on the concerned frequency) depends on the measurement configuration i.e. the reportInterval. The related performance requirements are specified in TS 36.133 [16].
  3> for each cell that is included in the measResultNeighCells, include the physCellId;
  3> if the triggerType is set to event; or the purpose is set to reportStrongestCells or to reportStrongestCellsForSON:
   4> for each included cell, include the layer 3 filtered measured results in accordance with the reportConfig for this measId, ordered as follows:
    5> if the measObject associated with this measId concerns E-UTRA:
     6> set the measResult to include the quantity(ies) indicated in the reportQuantity within the concerned reportConfig in order of decreasing triggerQuantity, i.e. the best cell is included first;
    5> if the measObject associated with this measId concerns UTRA FDD and if ReportConfigInterRAT includes the reportQuantityUTRA-FDD:

6> set the measResult to include the quantities indicated by the reportQuantityUTRA-FDD in order of decreasing measQuantityUTRA-FDD within the quantityConfig, i.e. the best cell is included first;
5> if the measObject associated with this measId concerns UTRA FDD and if ReportConfigInterRAT does not include the reportQuantityUTRA-FDD; or
5> if the measObject associated with this measId concerns UTRA TDD, GERAN or CDMA2000:
6> set the measResult to the quantity as configured for the concerned RAT within the quantityConfig in order of either decreasing quantity for UTRA and GERAN or increasing quantity for CDMA2000 pilotStrength, i.e. the best cell is included first;
3> else if the purpose is set to reportCGI:
4> if the mandatory present fields of the cgi-Info for the cell indicated by the cellForWhichToReportCGI in the associated measObject have been obtained:
5> if the cell broadcasts a CSG identity:
6> include the csg-Identity;
6> add a new entry for the received cellIndex to the blackCellsToAddModList;
6> include the csg-MemberStatus and set it to member if the cell is a CSG member cell;
5> if the si-RequestForHO is configured within the reportConfig associated with this measId:
6> include the cgi-Info containing all the fields that have been successfully acquired, except for the plmn-IdentityList;
5> else:
6> include the cgi-Info containing all the fields that have been successfully acquired;
1> if the ue-RxTxTimeDiffPeriodical is configured within the corresponding reportConfig for this measId;
2> set the ue-RxTxTimeDiffResult to the measurement result provided by lower layers;
2> set the currentSFN;
1> if the includeLocationInfo is configured in the corresponding reportConfig for this measId and detailed location information that has not been reported is available, set the content of the locationInfo as follows:
2> include the locationCoordinates;
2> if available, include the gnss-TOD-msec;
1> increment the numberOfReportsSent as defined within the VarMeasReportList for this measId by 1;
1> stop the periodical reporting timer, if running;
1> if the numberOfReportsSent as defined within the VarMeasReportList for this measId is less than the reportAmount as defined within the corresponding reportConfig for this measId:
2> start the periodical reporting timer with the value of reportInterval as defined within the corresponding reportConfig for this measId;
1> else:
2> if the triggerType is set to periodical:
3> remove the entry within the VarMeasReportList for this measId;
3> remove this measId from the measIdList within VarMeasConfig;

Now, a concept of small cell will be described.

In the 3rd or 4th mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a technique for increasing a radio capacity includes allocating more frequency resources, but there is a limit in allocating more frequency resources to a plurality of users with limited frequency resources.

An approach to use a high-frequency band and decrease a cell radius has been made in order to increase the cell capacity. When a small cell such as a pico cell or femto cell is adopted, a band higher than a frequency used in the existing cellular system may be used, and as a result, it is possible to transfer more information.

Figure 10:
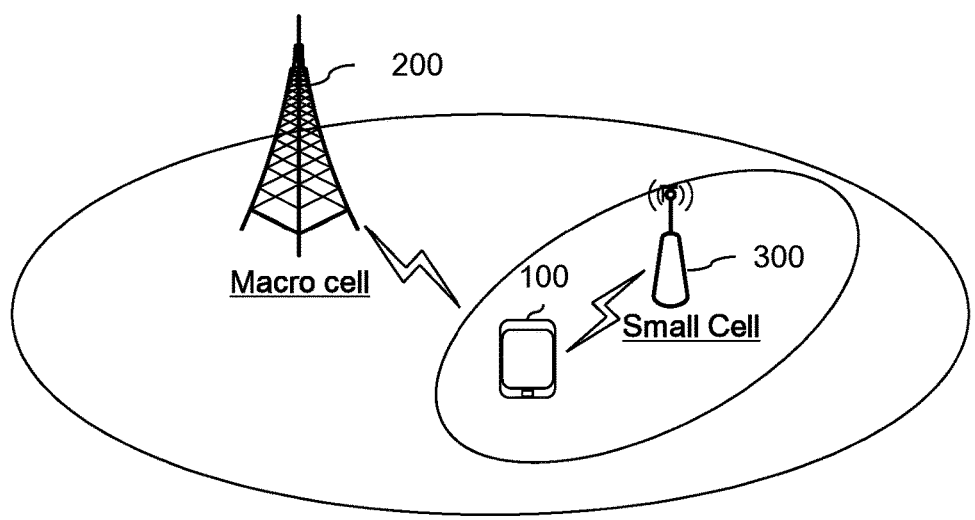
FIG. 10 shows one exemplary concept of coexistence of a macro cell and small cells.

FIG. 10 shows one exemplary concept of coexistence of a macro cell and small cells.

As shown in FIG. 10, a cell of a conventional eNodeB 200 may be called as a macro cell over small cells. The small cell may be deployed in a coverage of the macro cell.

However, due to dense deployment of small cells, intensive inter-frequency small cell measurements are need for the purpose of offloading. But, this is not desirable in terms of UE power consumption and serving cell service interruption time. It is desirable that UE performs inter-frequency measurement only when the UE is near small cell on that frequency. However, measurement object of LTE is a frequency, not a cell. Hence, if neighbor small cell and neighbor macro cell are on same frequency, UE will perform inter-frequency measurement even macro cell is identified.

Therefore, to minimize the above-explained disadvantage, the present disclosure provides solutions. For example, according to one example solution, the UE may perform the measurements only when the UE detects a cell having a cell identifier put on a cell list. Details about the one example solution are explained below.

Figure 11:
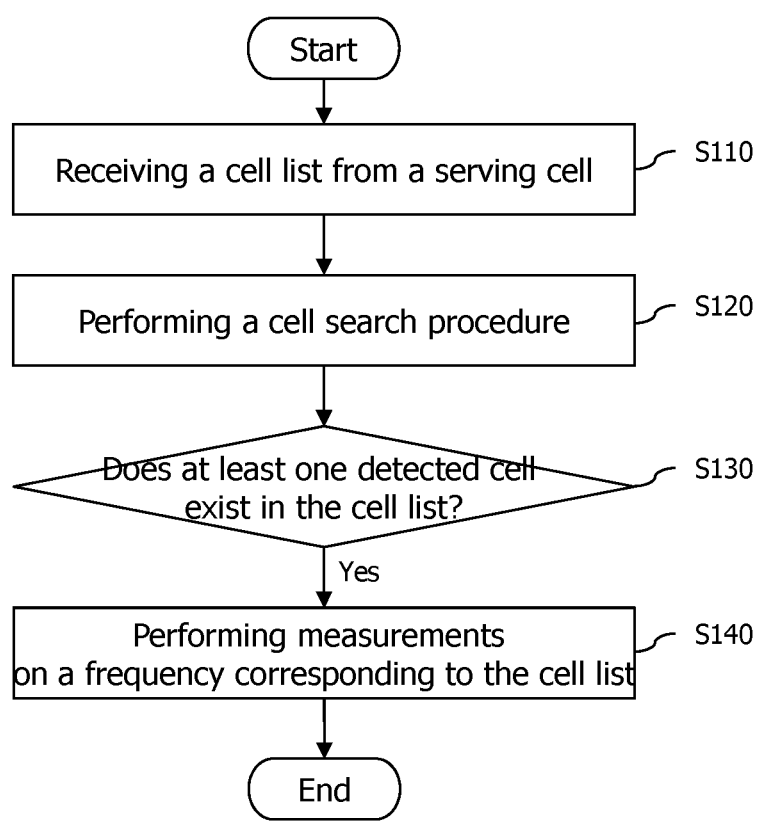
FIG. 11 shows a flow chart of one exemplary method.

FIG. 11 shows a flow chart of one exemplary method.

Referring to FIG. 11, the UE 100 receives a cell list from a serving cell (S110).

Also, the UE 100 performs a cell search procedure (S120). During the cell search procedure, the UE 100 acquires time and frequency synchronization with a neighboring cell and detects the physical layer Cell ID of the neighboring cell.

The UE determines whether during the cell search procedure at least one cell in the cell list is detected (S130).

According to results of the determination, the UE further determines whether to continue the neighboring cell measurement based on the detected cell. In other words, if the at least one cell in the cell list is detected, the UE 100 performs measurements on a frequency corresponding to the cell list (S140). Here, the measurement may performed when at least one of the following conditions is satisfied.

Also, the UE 100 applies layer 3 filtering for the measurements.

Condition 1: the detected cell is listed in the offloadinglist.
Condition 2: the detected cell is not a macro cell.
Condition 3: the detected cell is a small cell.

If the detected cell fulfils at least one of above conditions, the UE 100 continues the neighboring cell measurement. In other words, UE identifies CRS pattern of the detected cell and performs RSRP/RSRQ measurement for measurement object that the identified cell belongs to.

However, if any cell in the cell list is not detected, the UE 100 does not perform the measurements on the frequency corresponding to the cell list. Alternatively, the UE 100 may stop the measurement about the detected cell.

It is noted that the cell list may be configured to identify cells to which data between the current serving cell and the UE is to be offloaded. In this case, the cell list may be called as an offloading list. The cell list may include a number of physical cell identities.

The UE 100 may distinguish a small cell and a macro cell without receiving assistance information from network. For example, if special physical cell identities are reserved for small cell and if the UE knows the reserved values, then the UE 100 can know whether the detected cell is small cell or not by detecting the physical layer cell identity.

The cell search procedure may be performed with relaxed requirement.

Meanwhile, the one exemplary method is performed when at least one the following conditions is met:

If s-Measure is not configured; or

If s-Measure is configured and a RSRP for the PCell, after layer 3 filtering, is higher than this value:

If none of the conditions is met, the UE 100 may perform legacy measurement procedure.

Figure 12A:
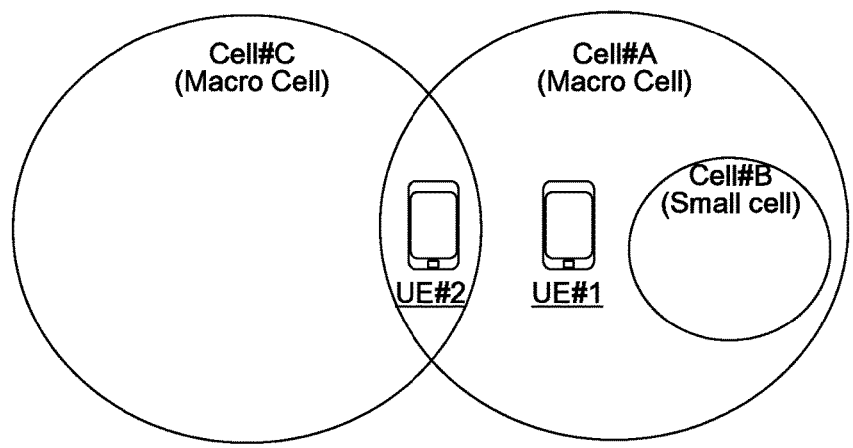
Figure 12B:
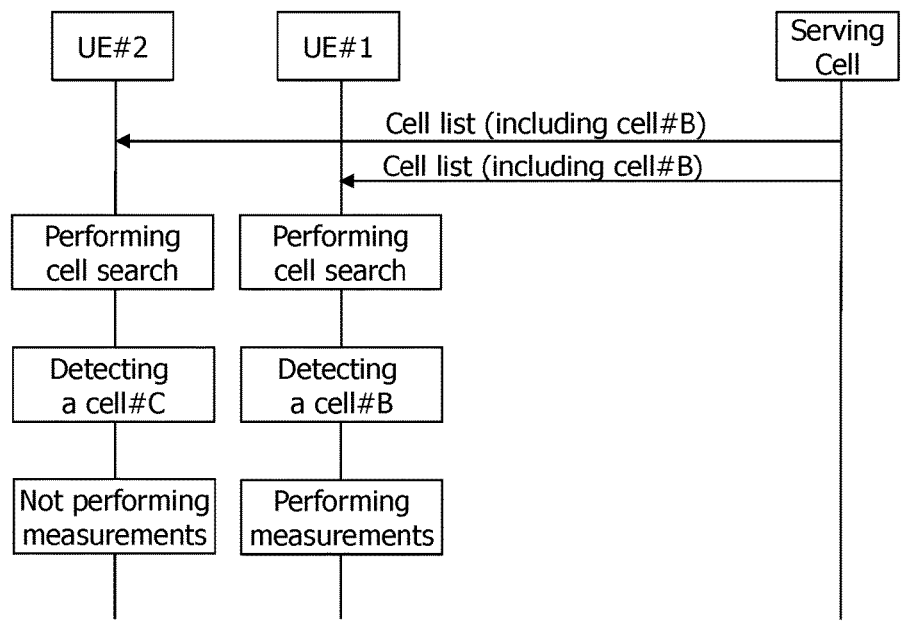

FIG. 12*a* show one exemplary scenario and FIG. 12*b* shows signal flows under the scenario shown in FIG. 12*a*.

Referring to FIG. 12*a*, there are a cell#A corresponding to a macro cell, a cell#B corresponding to a small cell and a cell#C corresponding to a macro cell. Also, as shown in FIG. 12*a*, a UE#1 is near the cell#C (i.e., small cell) and there is no small cell near UE#2.

Under the situation, as shown in FIG. 12*b*, the UE#1 and UE#2 receive the cell list (for example, offloading list) from a serving cell. The cell list includes physical cell ID of the cell#B.

The UE#1 and UE#2 start cell a cell search procedure. And, the UE#1 detects the cell#B which is listed in cell list, while the UE#2 detect the cell#C which is not listed in the cell list.

Then, the UE#1 performs RSRP/RSRQ measurement for cell#B. But, the UE#2 does not perform or stops the measurement for cell#C.

The ways or methods to solve the problem of the related art according to the present disclosure, as described so far, can be implemented by hardware or software, or any combination thereof.

Figure 13:
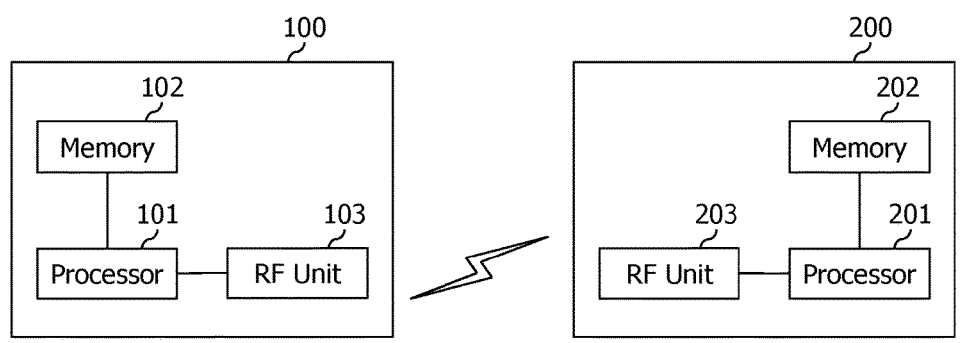
FIG. 13 is a block diagram showing a wireless communication system to implement an embodiment of the present invention.

FIG. 13 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

The eNodeB 200 includes a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the eNodeB may be implemented by the processor 201.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing measurement, the method performed by a user equipment (UE) and comprising:

receiving, by the UE, a cell list including cell identifiers from a serving cell;

performing a cell search procedure for detecting at least one cell having a cell identifier in the cell list; and performing, by the UE, measurements on a frequency corresponding to the cell list and applying layer 3 filtering for the measurements when at least three conditions are satisfied, wherein the three conditions include:

a first condition that a cell detected through the cell search procedure has a cell identifier in the cell list;

a second condition that the cell detected through the cell search procedure is not a macro cell; and a third condition that the cell detected through the cell search procedure is a small cell to which traffic of the UE is capable of being offloaded, and wherein if the three conditions are not satisfied, the measurements on the frequency corresponding to the cell list are not performed.

2. The method of claim 1, wherein the cell list includes the cell identifiers per a frequency.

3. The method of claim 1, further comprising:

stopping the measurements on the frequency corresponding to the cell list, if the three conditions are not satisfied.

4. A wireless equipment for performing measurement, the wireless equipment comprising:

a transceiver configured to receive a cell list including cell identifiers from a serving cell; and a processor connected to the transceiver and configured to:

perform a cell search procedure for detecting at least one cell having a cell identifier in the cell list; and perform measurements on a frequency corresponding to the cell list and apply layer 3 filtering for the measurements when at least three conditions are satisfied, wherein the three conditions include:

a first condition that a cell detected through the cell search procedure has a cell identifier in the cell list;

a second condition that the cell detected through the cell search procedure is not a macro cell; and a third condition that the cell detected through the cell search procedure is a small cell to which traffic of the wireless equipment is capable of being offloaded, and wherein if the three conditions are not satisfied, the measurements on the frequency corresponding to the cell list are not performed.

5. The wireless equipment of claim 4, wherein the cell list includes the cell identifiers per a frequency.

6. The wireless equipment of claim 4, wherein the processor is further configured to stop the measurements on the frequency corresponding to the cell list, if the three conditions are not satisfied.

* * * * *